(12) United States Patent
Pouget et al.

(10) Patent No.: US 9,834,648 B2
(45) Date of Patent: Dec. 5, 2017

(54) PHOTOACTIVATABLE SYSTEM FOR INHIBITING HYDROSILYLATION

(71) Applicant: Bluestar Silicones France SAS, Lyons (FR)

(72) Inventors: Emmanuel Pouget, Lyons (FR); Guillaume Pibre, Lyons (FR); Sebastien Marrot, Lyons (FR)

(73) Assignee: BLUESTAR SILICONES FRANCE SAS, Lyons (FR)

(*) Notice: Subject to any disclaimer, the term of this patent is extended or adjusted under 35 U.S.C. 154(b) by 0 days.

(21) Appl. No.: 15/104,788

(22) PCT Filed: Dec. 15, 2014

(86) PCT No.: PCT/EP2014/003352
§ 371 (c)(1),
(2) Date: Jun. 15, 2016

(87) PCT Pub. No.: WO2015/090551
PCT Pub. Date: Jun. 25, 2016

(65) Prior Publication Data
US 2016/0319086 A1  Nov. 3, 2016

(30) Foreign Application Priority Data

Dec. 20, 2013 (FR) .................................... 13 63276

(51) Int. Cl.
| | | |
|---|---|---|
| C08F 2/46 | (2006.01) | |
| C08F 2/50 | (2006.01) | |
| C08G 61/04 | (2006.01) | |
| C08J 3/28 | (2006.01) | |
| C08L 83/04 | (2006.01) | |
| C09D 183/04 | (2006.01) | |
| C08G 77/12 | (2006.01) | |
| C08G 77/20 | (2006.01) | |

(52) U.S. Cl.
CPC ............. C08J 3/28 (2013.01); C08L 83/04 (2013.01); C09D 183/04 (2013.01); *C08G 77/12* (2013.01); *C08G 77/20* (2013.01); *C08J 2383/07* (2013.01); *C08J 2483/05* (2013.01); *C08L 2205/025* (2013.01)

(58) Field of Classification Search
CPC ...... C08J 3/28; C08J 2483/07; C08J 2483/05; C08L 83/04; C08L 2205/025; C08L 83/00; C09D 183/04; C08K 5/10; C08K 5/14; C08K 5/05; C08K 5/005; C08K 5/5403
USPC ............... 522/8, 7, 6, 71, 189, 184, 1; 520/1
See application file for complete search history.

(56) References Cited

U.S. PATENT DOCUMENTS

| | | | |
|---|---|---|---|
| 4,640,939 A | 2/1987 | Cavezzan et al. | |
| 4,670,531 A | 6/1987 | Eckberg | |
| 9,120,935 B2 | 9/2015 | Marrot et al. | |
| 2009/0288431 A1* | 11/2009 | Rao ........................ | C09K 5/045 62/114 |
| 2012/0328787 A1 | 12/2012 | Marrot et al. | |
| 2014/0004359 A1* | 1/2014 | Marrot ................... | C08L 83/04 428/447 |

FOREIGN PATENT DOCUMENTS

| | | | |
|---|---|---|---|
| EP | 0238033 | * | 9/1987 |
| EP | 0238033 A2 | | 9/1987 |
| WO | 9210529 A1 | | 6/1992 |
| WO | 2011076710 A1 | | 6/2011 |
| WO | 2012085364 A1 | | 6/2012 |
| WO | 2012175825 A1 | | 12/2012 |

OTHER PUBLICATIONS

Kiyohiro et al, EP 0238033 Machine Translation, Sep. 23, 1987.*
International Search Report dated Jan. 28, 2015 in counterpart European Application No. PCT/EP2014/003352.

* cited by examiner

*Primary Examiner* — Jessica E Whiteley
(74) *Attorney, Agent, or Firm* — McBee Moore Woodward & Vanik IP, LLC

(57) ABSTRACT

The present invention relates to a hardenable silicone composition including an irradiation-activated system for temporarily inhibiting the hydrosilylation reaction. Said system includes at least one inhibitor selected from among α-acetylenic alcohols, α-α'-acetylenic diesters, conjugated ene-yne compounds, α-acetylenic ketones, acrylonitriles, maleates, fumarates, the mixture thereof, at least one photoinitiator, and tris(trimethylsilyl)silane (TTMSS). The invention also relates to a method for preparing a silicone coating and hard elastomer materials provided comprising said silicone composition.

20 Claims, 1 Drawing Sheet

PHOTOACTIVATABLE SYSTEM FOR INHIBITING HYDROSILYLATION

CROSS REFERENCE TO RELATED APPLICATIONS

This application is a §371 National Stage Application of PCT/EP2014/003352, filed 15 Dec. 2014, which claims priority to FR 13/63276, filed 20 Dec. 2013.

BACKGROUND

Field Of The Invention

The present invention falls within the technical field of the preparation of silicone compositions. More specifically, the present invention relates to curable silicone compositions comprising a novel system for inhibiting hydrosilylation reactions.

Description of Related Art

In the field of silicones, hydrosilylation, also known as polyaddition, is a major reaction.

During a hydrosilylation reaction, a compound comprising at least one unsaturation reacts with a compound comprising at least one hydrogen atom bonded to a silicon atom. This reaction may be described, for example, by reaction equation (1) in the case of an unsaturation of alkene type:

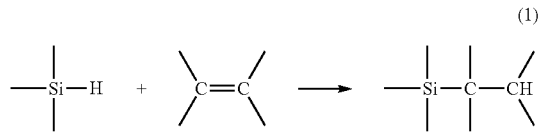
(1)

or by reaction equation (2) in the case of an unsaturation of alkyne type:

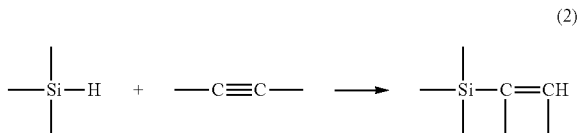
(2)

Hydrosilylation thus makes it possible, firstly, to gain access to functionalized silanes or siloxanes, and, secondly, to form silicone networks by crosslinking between polysiloxanes comprising Si—H units and polysiloxanes comprising Si-vinyl units. A conventional use of this reaction is the formation of non-stick silicone coatings or films on paper or polymer supports.

Hydrosilylation reactions are conventionally performed by catalysis. Typically, the suitable catalyst for this reaction is a platinum catalyst, for instance chloroplatinic acid hexahydrate or the Karstedt catalyst which is constituted of platinum complexes with divinyltetramethyldisiloxane as ligand (see, for example, in U.S. Pat. No. 3,775,452). In small amount, this catalyst makes it possible to perform hydrosilylation reactions at room temperature with rapid kinetics, of the order of a few minutes.

In order to have the time to prepare, transport and use the composition before it has cured, it is often necessary to temporarily inhibit the hydrosilylation reaction. For example, when it is desired to coat a paper or polymer substrate with a non-stick silicone coating, the silicone composition is formulated to form a bath that must remain liquid at room temperature for several hours before being deposited on the substrate. It is only after this deposition that it is desired for curing by hydrosilylation to take place. Hydrosilylation reaction inhibitors may be of several kinds. The most widespread are thermal inhibitors. When maintained at room temperature, they inhibit the hydrosilylation reaction. By raising the temperature of the reaction medium, the inhibition is deactivated and the hydrosilylation reaction is activated. Conventionally, thermal activation is performed by introducing the substrates coated with the curable silicone composition into coating ovens whose temperature is maintained between 100° C. and 150° C. Examples of thermal inhibitors and of their use are described in patent applications WO 2011/076710, WO 2012/085364 and WO 2012/175825. The major drawback of the thermal activation of hydrosilylation is that it cannot be used on a substrate that is not heat-resistant.

To solve this problem, it has been proposed to use hydrosilylation reactions that can be triggered by exposure to UV radiation. To do this, one solution consists in providing a specific hydrosilylation catalyst that is activatable by UV radiation, as described, for example, in international patent application WO 92/10529. Another solution consists in using a standard hydrosilylation catalyst and in adding a photoinhibitor thereto: the function of the photoinhibitor is to prevent the hydrosilylation reaction when it is present in the reaction medium. However, in contrast with the thermal inhibitor, a photoinhibitor is not deactivated by heat, but rather by exposure to UV radiation.

Examples of photoinhibitors have been given in the literature. U.S. Pat. Nos. 4,640,939 and 4,670,531 describe the use of azo compounds as reaction inhibitor. European patent application EP 0 238 033 discloses photocurable polyorganosiloxane compositions containing an essentially linear diorganopolysiloxane comprising chain-end vinyl functions, an organohydrogenopolysiloxane, a platinum-based catalyst, a photosensitizer and optionally a modulating compound whose function is to prevent premature reaction of the curable compositions. The modulators described are acetylenic compounds such as 3,5-dimethyl-1-hexyn-3-ol, 3-methyl-1-butyn-3-ol, 3-methyl-3-penten-1-yne, 3-methyl-1-pentyn-3-ol and 5,5-dimethyl-3-hexen-1-yne. Moreover, U.S. Pat. No. 5,082,871 describes the use of compounds of acetylene-dialkyl dicarboxylate type as platinum-catalyzed hydrosilylation reaction inhibitor that is deactivatable by UV irradiation.

One of the essential functions of an inhibition system is thus to efficiently prevent the hydrosilylation reaction for as long as necessary before activation. To do this, it may be necessary to use large amounts of inhibitor, which causes strong inhibition of the hydrosilylation catalyst. The consequence of this is that the rate of curing of the composition, even after activation, is slowed down, which is a major drawback from an industrial viewpoint since this especially makes it obligatory to reduce the coating speed and thus the rate of production.

It would therefore be advantageous to have available novel hydrosilylation inhibition systems that are deactivatable thermally or by UV irradiation. It is desired to have available hydrosilylation-curable silicone compositions containing an inhibition system that simultaneously makes it possible:

to inhibit the hydrosilylation reaction for as long as necessary before activation, to ensure rapid removal of the inhibition at the time of activation, and preferably, to ensure a high rate of crosslinking.

SUMMARY

One subject of the present invention is a curable silicone composition comprising:

A. at least one organopolysiloxane comprising, per molecule, at least two alkenyl radicals bonded to silicon atoms;
B. at least one organohydrogenopolysiloxane comprising, per molecule, at least two hydrogen atoms bonded to silicon atoms, and preferably at least three hydrogen atoms bonded to silicon atoms;
C. at least one hydrosilylation catalyst;
D. at least one inhibitor chosen from α-acetylenic alcohols, α,α'-acetylenic diesters, conjugated ene-yne compounds, α-acetylenic ketones, acrylonitriles, maleates and fumarates, and mixtures thereof,
E. at least one photoinitiator,
F. tris(trimethylsilyl)silane (TTMSS).

The inventors have discovered, entirely surprisingly, that the mixture of an inhibitor, a photoinitiator and TTMSS as described above functions synergistically and makes it possible to ensure good inhibition of the hydrosilylation reaction while at the same time having improved inhibition-removal kinetics relative to the known compounds.

A subject of the present invention is thus also the use of a mixture of an inhibitor chosen from α-acetylenic alcohols, α,α'-acetylenic diesters, conjugated ene-yne compounds, α-acetylenic ketones, acrylonitriles, maleates and fumarates, and mixtures thereof, a photoinitiator and TTMSS as inhibition system in a curable silicone composition.

This curable silicone composition is particularly suitable for preparing silicone coatings, and most particularly for preparing non-stick silicone coatings. This is why a subject of the present invention is also a process for preparing a silicone coating on a substrate, comprising the steps consisting in coating said substrate with said curable silicone composition and curing this composition by irradiation.

Moreover, this curable silicone composition may also be used for preparing hard elastomer materials.

DETAILED DESCRIPTION OF A PREFERRED EMBODIMENT

Figure 1:
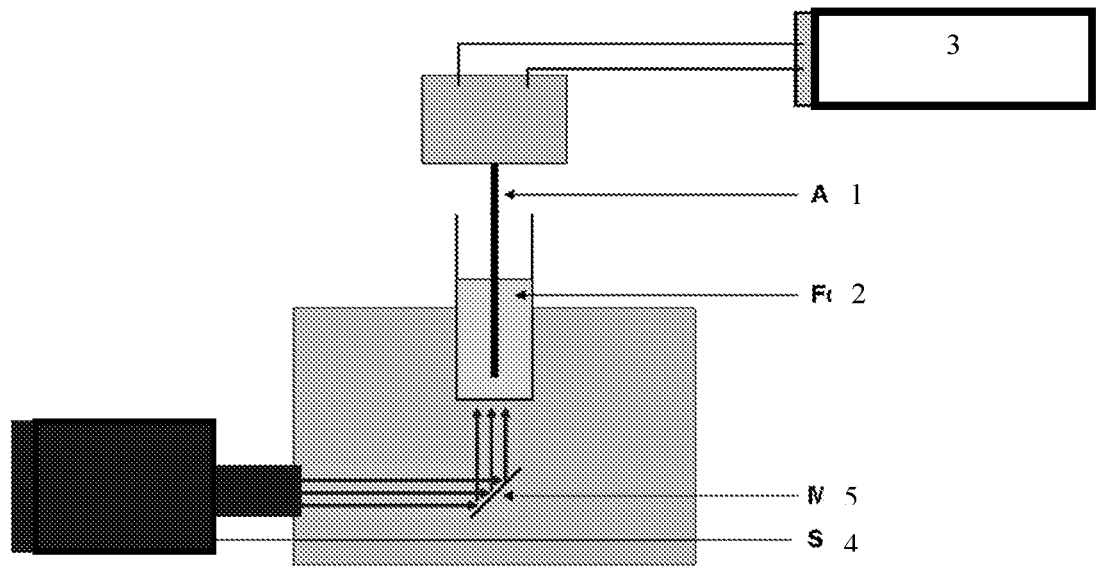
FIG. 1 represents the experimental device used in the examples.

It is understood that, in the context of this description, the term "between . . . and . . . " should be interpreted as including the indicated limits.

One subject of the present invention is thus a curable silicone composition comprising:

A. at least one organopolysiloxane comprising, per molecule, at least two alkenyl radicals bonded to silicon atoms;
B. at least one organohydrogenopolysiloxane comprising, per molecule, at least two hydrogen atoms bonded to silicon atoms, and preferably at least three hydrogen atoms bonded to silicon atoms;
C. at least one hydrosilylation catalyst;
D. at least one inhibitor chosen from α-acetylenic alcohols, α,α'-acetylenic diesters, conjugated ene-yne compounds, α-acetylenic ketones, acrylonitriles, maleates and fumarates, and mixtures thereof,
E. at least one photoinitiator,
F. tris(trimethylsilyl)silane (TTMSS).

The combination of compounds D, E and F is capable of temporarily inhibiting a hydrosilylation reaction between compounds A and compounds B in the presence of the hydrosilylation catalyst C.

Firstly, the composition according to the invention comprises at least one inhibitor D chosen from α-acetylenic alcohols, α,α'-acetylenic diesters, conjugated ene-yne compounds, α-acetylenic ketones, acrylonitriles, maleates and fumarates, and mixtures thereof. These compounds capable of acting as hydrosilylation inhibitor are well known to those skilled in the art. They may be used alone or as mixtures.

An inhibitor D of α-acetylenic alcohol type may be chosen from the compounds of formula (D1) below:

$$(R^1)(R^2)C(OH)-C\equiv CH \qquad (D1)$$

in which
the group $R^1$ represents an alkyl group, a cycloalkyl group, a (cycloalkyl)alkyl group, an aryl group or an arylalkyl group,
the group $R^2$ represents a hydrogen atom, an alkyl group, a cycloalkyl group, a (cycloalkyl)alkyl group, an aryl group or an arylalkyl group,
or $R^1$ and $R^2$ constitute, together with the carbon atom to which they are attached, a 5-, 6-, 7- or 8-membered aliphatic ring, optionally substituted one or more times.

According to the invention, the term "alkyl" means a saturated hydrocarbon-based chain containing from 1 to 20 carbon atoms, preferably from 1 to 8 carbon atoms. An alkyl group may be chosen from the group constituted by methyl, ethyl, isopropyl, n-propyl, tert-butyl, isobutyl, n-butyl, n-pentyl, isoamyl and 1,1-dimethylpropyl.

According to the invention, the term "cycloalkyl" means a saturated monocyclic or polycyclic, preferably monocyclic or bicyclic, hydrocarbon-based group containing from 3 to 20 carbon atoms, preferably from 5 to 8 carbon atoms. When the cycloalkyl group is polycyclic, the multiple ring nuclei may be attached to each other via a covalent bond and/or via a spirane atom and/or may be fused together. A cycloalkyl group may be chosen from the group constituted by cyclopropyl, cyclobutyl, cyclopentyl, cyclohexyl, cycloheptyl, cyclooctyl, adamantane and norborane.

According to the invention, the term "(cycloalkyl)alkyl" means a cycloalkyl group as defined above linked to an alkyl group also as defined above.

According to the invention, the term "aryl" means a monocyclic or polycyclic aromatic hydrocarbon-based group containing from κ to 18 carbon atoms. An aryl group may be chosen from the group constituted by phenyl, naphthyl, anthracenyl and phenanthryl.

According to the invention, the term "aralakyl" means an aryl group as defined above linked to an alkyl group also as defined above.

According to a preferred embodiment, $R^1$ and $R^2$ constitute, together with the carbon atom to which they are attached, an unsubstituted 5-, 6-, 7- or 8-membered aliphatic ring. According to another preferred embodiment, $R^1$ and $R^2$, which may be identical or different, represent, independently of each other, a monovalent $C_1$ to $C_{12}$, preferably $C_1$ to $C_6$, alkyl group.

An inhibitor D which is an α-acetylenic alcohol that is useful according to the invention may be chosen from the group constituted by the following compounds: 1-ethynyl-1-cyclopentanol; 1-ethynyl-1-cyclohexanol (also known as ECH); 1-ethynyl-1-cycloheptanol; 1-ethynyl-1-cyclooctanol; 3-methyl-1-butyn-3-ol (also known as MBT); 3-methyl-1-pentyn-3-ol; 3-methyl-1-hexyn-3-ol; 3-methyl-1-heptyn-3-ol; 3-methyl-1-octyn-3-ol; 3-methyl-1-nonyn-3-ol; 3-methyl-1-decyn-3-ol; 3-methyl-1-dodecyn-3-ol; 3-methyl-1-pentadecyn-3-ol; 3-ethyl-1-pentyn-3-ol; 3-ethyl-1-hexyn-3-ol; 3-ethyl-1-heptyn-3-ol; 3,5-dimethyl-1-hexyn-3-ol; 3-isobutyl-5-methyl-1-hexyn-3-ol; 3,4,4-trimethyl-1-pentyn-3-ol; 3-ethyl-5-methyl-1-heptyn-3-ol; 3,6-diethyl-1-nonyn-3-ol; 3,7,11-trimethyl-1-dodecyn-3-ol (also known as TMDDO); 1,1-diphenyl-2-propyn-1-ol; 3-butyn-2-ol; 1-pentyn-3-ol; 1-hexyn-3-ol; 1-heptyn-3-ol; 5-methyl-1-hexyn-3-ol; 4-ethyl-1-octyn-3-ol and 9-ethynyl-9-fluorenol.

An inhibitor D of α,α'-acetylenic diester type may be chosen from the compounds of formula (D2) below:

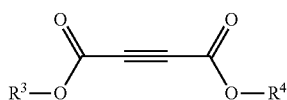

(D2)

in which the groups $R^3$ and $R^4$, which may be identical or different, represent, independently of each other, an alkyl group, a cycloalkyl group, a (cycloalkyl)alkyl group, an aryl group, an arylalkyl group or a silyl group.

According to the invention, the term "silyl" means a group of formula —$SiR_3$, each R independently representing an alkyl group containing from 1 to 20 carbon atoms, preferably from 1 to 8 carbon atoms. A silyl group may be, for example, the trimethylsilyl group.

According to a particular embodiment, $R^3$ and $R^4$, which may be identical or different, represent, independently of each other, a $C_1$ to $C_{12}$, preferably $C_1$ to $C_6$ alkyl group, or the trimethylsilyl group. An inhibitor D which is an α,α'-acetylenic diester that is useful according to the invention may be chosen from the group constituted by the following compounds: dimethyl acetylenedicarboxylate (DMAD), diethyl acetylenedicarboxylate, tert-butyl acetylenedicarboxylate and bis(trimethylsilyl) acetylenedicarboxylate.

An inhibitor D of conjugated ene-yne compound type may be chosen from the compounds of formula (D3) below:

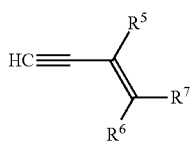

(D3)

in which:
the groups $R^5$, $R^6$ and $R^7$ represent, independently of each other, a hydrogen atom, an alkyl group, a cycloalkyl group, a (cycloalkyl)alkyl group, an aryl group or an arylalkyl group,
or at least two groups from among the groups $R^5$, $R^6$ and $R^7$ constitute, together with the carbon atom(s) to which they are attached, a 5-, 6-, 7- or 8-membered aliphatic ring, optionally substituted one or more times.

According to a particular embodiment, the groups $R^5$, $R^6$ and $R^7$ represent, independently of each other, a hydrogen atom, a $C_1$ to $C_{12}$, preferably $C_1$ to $C_6$, alkyl group, or an aryl group. An inhibitor D which is a conjugated ene-yne compound that is useful according to the invention may be chosen from the group constituted by the following compounds: 3-methyl-3-pentene-1-yne; 3-methyl-3-hexene-1-yne; 2,5-dimethyl-3-hexene-1-yne; 3-ethyl-3-butene-1-yne; and 3-phenyl-3-butene-1-yne. According to another particular embodiment, two groups chosen from the groups $R^5$, $R^6$ and $R^7$ constitute, together with the carbon atom(s) to which they are attached, an unsubstituted 5-, 6-, 7- or 8-membered aliphatic ring and the remaining third group represents a hydrogen atom or a $C_1$ to $C_{12}$, preferably $C_1$ to $C_6$, alkyl group. An inhibitor D which is a conjugated ene-yne compound that is useful according to the invention may be 1-ethynyl-1-cyclohexene.

An inhibitor D of α-acetylenic ketone type may be chosen from the compounds of formula (D4) below:

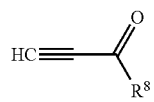

(D4)

in which $R^8$ represents an alkyl group, a cycloalkyl group, a (cycloalkyl)alkyl group, an aryl group or an arylalkyl group, the alkyl, cycloalkyl, (cycloalkyl)alkyl, aryl or arylalkyl groups possibly being substituted one or more times with a chlorine, bromine or iodine atom.

According to a preferred embodiment, $R^8$ represents a monovalent $C_1$ to $C_{12}$, preferably $C_1$ to $C_6$, alkyl group, optionally substituted one or more times with a chlorine or bromine atom, or a cycloalkyl group, or an aryl group. An inhibitor D which is an α-acetylenic ketone that is useful according to the invention may be chosen from the group constituted by the following compounds: 1-octyn-3-one, 8-chloro-1-octyn-3-one; 8-bromo-1-octyn-3-one; 4,4-dimethyl-1-octyn-3-one; 7-chloro-1-heptyn-3-one; 1-hexyn-3-one; 1-pentyn-3-one; 4-methyl-1-pentyn-3-one; 4,4-dimethyl-1-pentyn-3-one; 1-cyclohexyl-1-propyn-3-one; benzoacetylene and o-chlorobenzoyl-acetylene.

An inhibitor D of acrylonitrile type may be chosen from the compounds of formula (D5) below:

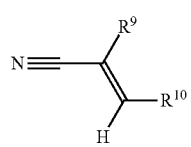

(D5)

in which $R^9$ and $R^{19}$ represent, independently of each other, a hydrogen atom, a chlorine, bromine or iodine atom, an alkyl group, a cycloalkyl group, a (cycloalkyl)alkyl group, an aryl group or an arylalkyl group, the alkyl, cycloalkyl, (cycloalkyl)alkyl, aryl or arylalkyl groups possibly being substituted one or more times with a chlorine, bromine or iodine atom. An inhibitor D which is an acrylonitrile that is useful according to the invention may be chosen from the group constituted by the following compounds: acrylonitrile; methacrylonitrile; 2-chloroacrylonitryl; crotononitrile and cinnamonitrile.

An inhibitor D of maleate or fumarate type may be chosen from the compounds of formulae (D6) and (D7) below:

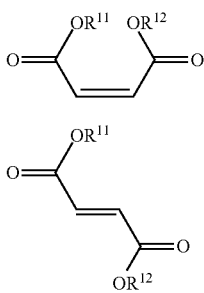

(D6)

(D7)

in which $R^{11}$ and $R^{12}$, which may be identical or different, represent, independently of each other, an alkyl or alkenyl group, a cycloalkyl group, a (cycloalkyl)alkyl group, an aryl group or an arylalkyl group, said alkyl, alkenyl, cycloalkyl, (cycloalkyl)alkyl, aryl and arylalkyl groups possibly being substituted with an alkoxy group.

According to the invention, the term "alkenyl" means a saturated hydrocarbon-based chain containing from 1 to 20 carbon atoms, preferably from 1 to 8 carbon atoms, comprising at least one double unsaturation. An alkenyl group may be chosen from the group constituted by vinyl or allyl.

According to the invention, the term "alkoxy" means an alkyl group as defined above bonded to an oxygen atom. An alkoxy group may be chosen from the group constituted by methoxy, ethoxy, propoxy and butoxy.

According to a particular embodiment, $R^{11}$ and $R^{12}$, which may be identical or different, represent, independently of each other, a $C_1$ to $C_{12}$, preferably $C_1$ to $C_6$, alkyl or alkenyl group, optionally substituted with a $C_1$ to $C_6$ alkoxy group.

An inhibitor D which is a maleate or a fumarate that is useful according to the invention may be chosen from the group constituted by diethyl fumarate, diethyl maleate, diallyl fumarate, diallyl maleate and bis(methoxyisopropyl) maleate.

Inhibitors D chosen from α-acetylenic alcohols, α,α'-acetylenic diesters, conjugated ene-yne compounds, α-acetylenic ketones, acrylonitriles, maleates and fumarates are commercially available. Mention may be made especially of ECH, which is commercially available from BASF, dimethyl maleate which is commercially available from DMS and dimethyl acetylenedicarboxylate which is available from City Chemical LLC.

Besides the inhibitor compound D, the composition according to the invention comprises at least one photoinitiator E. A photoinitiator is a chemical compound or a combination of several chemical compounds (in this case it may be referred to as a photoinitiator system) that is capable of generating free radicals by absorption of radiation with a wavelength of between 200 nm and 800 nm. It is possible to use, in combination with a photoinitiator, a photosensitizer compound. Photosensitizer compounds are well known to those skilled in the art. They are molecules that are capable of absorbing radiation and of transferring this energy to another molecule, in the present case the photoinitiator.

Photoinitiator compounds are well known to those skilled in the art. They may be used alone or as mixtures.

Conventionally, photoinitiators are classified into two major categories depending on their mechanism of initiation: type I photoinitiators and type II photoinitiators.

Type I photoinitiators are characterized in that the compounds undergo homolytic cleavage of a bond generating radicals that are capable of initiating the photopolymerization reaction. Type I photoinitiators may be chosen, for example, from the group constituted by:

benzoin and benzoin ethers: benzoin methyl ether, benzoin butyl ether;

acetophenones: for example unsubstituted acetophenone, 3-methylacetophonone, 4-methylacetophonone, 3-pentylacetophonone, 4-methoxyacetophonone, 3-bromoacetophonone, 4-allylacetophonone;

α-hydroxy ketones, and especially α-hydroxyacetophenones: for example bis[4-(2-hydroxy-2-methylpropionyl)phenyl]methane, 2-hydroxy-1-[4-4-(2-hydroxy-2-methylpropionyl)phenoxy)phenyl]-2-methyl-1-one, 2-hydroxy-2-methyl-1-phenylpropan-1-one, 2-hydroxy-2-methyl-1-(4-tert-butyl)phenylpropan-1-one;

acylphosphine oxides.

Type II photoinitiators are characterized in that they do not undergo a fragmentation reaction when, after irradiation, they change into their excited state (known as the "triplet" state). Thus, irradiation causes a hydrogen transfer reaction or an electron transfer followed by a proton transfer between the photoinitiator and a co-initiator. Type II photoinitiators may be chosen from the group constituted by:

benzophenones: for example unsubstituted benzophenone, 3-methoxybenzophenone, 4-methoxybenzophenone, 4-methylbenzophenone, 4-chlorobenzophenone, 4,4'-dimethoxybenzophenone, 4-chloro-4'-benzylbenzophenone, 2,4,6-trimethylbenzophenone;

thioxanthones: for example isopropylthioxanthone;

camphorquinone.

The co-initiators may be chosen from the group constituted by ethers, amides, amines, thiols, thioethers, sulfates, carboxinates and aliphatic alcohols, and preferably from the following compounds: N-phenylglycine, ethyl-p-dimethylaminobenzoate, phenyltetrazolethiol, 2-mercaptobenzothiazole, and mixtures thereof.

A large number of photoinitiators are commercially available. Mention may be made especially of:

as type I photoinitiator: those sold, for example, by the companies IGM Resins, Lambson, BASF, Lamberti and Chivacure, for example the photoinitiator Omnirad 102 from IGM Resins, the photoinitiators Irgacure® 184, 1173, 2959, MBF, 754, 651, 369, 907, 1300, TPO, 819, 2100 and 784 from BASF, and the photoinitiators Esacure® KIP100F and KIP150 from Lamberti;

as type II photoinitiator: the photoinitiator Esacure® TZT from Lamberti, the photoinitiator Irgacure® BP from BASF, the photoinitiators Omnirad CTX, DETX and ITX from IGM Resins, and the co-initiator Esacure® EDB from Lamberti.

According to a preferred embodiment, the composition according to the invention comprises at least one type I photoinitiator, and more preferentially at least one α-hydroxyacetophenone.

According to another preferred embodiment, the composition according to the invention comprises at least one type II photoinitiator, and more preferentially at least one benzophenone or a mixture of several benzophenones.

Finally, the composition according to the invention comprises tris(trimethylsilyl)silane F. This chemical compound of formula $(CH_3Si)_3SiH$ is commonly known as "TTMSS". It is commercially available, for example from Aldrich.

The mole ratios between the inhibitor D, the photoinitiator E and TTMSS are preferably such that:

the mole ratio between TTMSS and the inhibitor D is between 0.0001 and 20, more preferably between 0.001 and 5, and even more preferably between 0.001 and 3; and/or the mole ratio between TTMSS and the photoinitiator E is between 0.001 and 10, more preferably between 0.005 and 5, and even more preferably between 0.01 and 2.

The inventors have discovered that the inhibitor D, the photoinitiator E and TTMSS F as described above could be used advantageously as inhibition system in polyaddition-curable silicone compositions. It has been discovered, entirely surprisingly, that the presence of these three compounds produces a synergistic effect: the inhibition system obtained advantageously makes it possible to ensure good inhibition of the hydrosilylation reaction while at the same time having improved inhibition-removing kinetics relative to the known compositions.

The silicone composition according to the invention is curable. It is capable of crosslinking by hydrosilylation when it is exposed to a source of irradiation or a source of heat. This is a silicone composition that is curable via polyaddition reactions.

Preferably, the polyorganosiloxane A according to the invention bears at least two alkenyl groups bonded to silicon atoms. According to a preferred embodiment, this polyorganosiloxane A comprises:

(i) at least two units of formula (A1):

$$Y_a Z_b SiO_{(4-(a+b)/2}$$  (A1)

in which:
Y represents a monovalent radical containing from 2 to 12 carbon atoms, having at least one alkene function and optionally at least one heteroatom,
Z represents a monovalent radical containing from 1 to 20 carbon atoms and not comprising any alkene or alkyne functions;
a and b represent integers, a being 1, 2 or 3, b being 0, 1 or 2 and (a+b) being 1, 2 or 3;
(ii) and optionally comprising other units of formula (A2):

$$Z_c SiO_{(4-c)/2}$$  (A2)

in which:
Z has the same meaning as above, and
c represents an integer between 0 and 3.

It is understood in formula (A1) and in formula (A2) above that, if several radicals Y and Z are present, they may be identical to or different from each other.

In formula (A1), the symbol a may preferentially be 1 or 2, more preferentially 1.

Furthermore, in formula (A1) and in formula (A2), Z may represent a monovalent radical chosen from the group constituted by an alkyl group containing 1 to 8 carbon atoms, optionally substituted with at least one halogen atom, and an aryl group. Z may advantageously represent a monovalent radical chosen from the group constituted by methyl, ethyl, propyl, 3,3,3-trifluoropropyl, xylyl, tolyl and phenyl.

In addition, in formula (A1), Y may advantageously represent a radical chosen from the group constituted by vinyl, propenyl, 3-butenyl, 5-hexenyl, 9-decenyl, 10-undecenyl, 5,9-decadienyl and 6,11-dodecadienyl.

The polyorganosiloxane A may represent a linear, branched, cyclic or network structure.

When it concerns linear polyorganosiloxanes, they may be constituted essentially of:
siloxyl units "D" chosen from the units of formulae $Y_2SiO_{2/2}$, $YZSiO_{2/2}$ and $Z_2SiO_{2/2}$;
siloxyl units "M" chosen from the units of formulae $Y_3SiO_{1/2}$, $Y_2ZSiO_{1/2}$, $YZ_2SiO_{1/2}$ and $Z_3SiO_{2/2}$.

As examples of units "D", mention may be made of dimethylsiloxy, methylphenylsiloxy, methylvinylsiloxy, methylbutenylsiloxy, methylhexenylsiloxy, methyldecenylsiloxy and methyldecadienylsiloxy groups.

As examples of units "M", mention may be made of trimethylsiloxy, dimethylphenylsiloxy, dimethylvinylsiloxy and dimethylhexenylsiloxy groups.

These linear polyorganosiloxanes may be oils with a dynamic viscosity at 25° C. of between 1 mPa·s and 100 000 mPa·s, preferentially between 10 mPa·s and 5 000 mPa·s, or gums with a dynamic viscosity at 25° C. of greater than 100 000 mPa·s.

When it concerns cyclic polyorganosiloxanes, they may be constituted of siloxyl units "D" chosen from the units of formulae $Y_2SiO_{2/2}$, $YZSiO_{2/2}$ and $Z_2SiO_{2/2}$. Examples of such units "D" are described above. These cyclic polyorganosiloxanes may have a dynamic viscosity at 25° C. of between 1 mPa·s and 5 000 mPa·s.

The dynamic viscosity at 25° C. of all the polymers described in the present patent application may be measured using a Brookfield viscometer.

Examples of polyorganosiloxanes A are:
polydimethylsiloxanes bearing dimethylvinylsilyl end groups;
poly(methylphenylsiloxane-co-dimethylsiloxane)s bearing dimethylvinylsilyl end groups;
poly(vinylmethylsiloxane-co-dimethylsiloxane)s bearing dimethylvinylsilyl end groups;
poly(dimethylsiloxane-co-vinylmethylsiloxane)s bearing trimethylsilyl end groups;
cyclic polymethylvinylsiloxanes.

The organohydrogenopolysiloxane B according to the invention bears at least two hydrogen atoms bonded to silicon atoms, and preferably at least three hydrogen atoms bonded to silicon atoms. According to a preferred embodiment, this polyorganosiloxane B comprises:

(i) at least two units of formula (B1), and preferably at least three units of formula (B1):

$$H_d L_e SiO_{(4-(d+e))/2}$$  (B1)

in which:
L represents a monovalent radical other than a hydrogen atom,
H represents a hydrogen atom,
d and e represent integers, d being 1 or 2, e being 0, 1 or 2 and (d+e) being 1, 2 or 3;
and optionally other units of formula (B2):

$$L_f SiO_{(4-f)/2}$$  (B2)

in which:
L has the same meaning as above, and
f represents an integer between 0 and 3.

It is understood in formula (B1) and in formula (B2) above that if several groups L are present, they may be identical to or different from each other.

In formula (B1), the symbol d may preferentially be 1.

Furthermore, in formula (B1) and in formula (B2), L may represent a monovalent radical chosen from the group constituted by an alkyl group containing 1 to 8 carbon atoms, optionally substituted with at least one halogen atom, and an aryl group. L may advantageously represent a monovalent radical chosen from the group constituted by methyl, ethyl, propyl, 3,3,3-trifluoropropyl, xylyl, tolyl and phenyl. Examples of units of formula (B1) are the following: $H(CH_3)_2SiO_{1/2}$, $HCH_3SiO_{2/2}$ and $H(C_6H_5)SiO_{2/2}$.

The polyorganosiloxane B may represent a linear, branched, cyclic or network structure.

When linear polyorganosiloxanes are concerned, they may be constituted essentially of:
- siloxyl units "D" chosen from the units of formulae $HLSiO_{2/2}$ and $L_2SiO_{2/2}$;
- siloxyl units "M" chosen from the units of formulae $HL_2SiO_{1/2}$ and $L_3SiO_{2/2}$.

These linear polyorganosiloxanes may be oils with a dynamic viscosity at 25° C. of between 1 mPa·s and 100 000 mPa·s, preferentially between 10 mPa·s and 5 000 mPa·s, or gums with a dynamic viscosity at 25° C. of greater than 100 000 mPa·s.

When cyclic polyorganosiloxanes are concerned, they may be constituted of siloxyl units "D" chosen from the units of formulae $HLSiO_{2/2}$ and $L_2SiO_{2/2}$, or of siloxyl units of formula $HLSiO_{2/2}$ only. The units of formula $L_2SiO_{2/2}$ may especially be dialkylsiloxy or alkylarylsiloxy. These cyclic polyorganosiloxanes may have a dynamic viscosity at 25° C. of between 1 mPa·s and 5 000 mPa·s.

Examples of polyorganosiloxanes B are:
- polydimethylsiloxanes bearing hydrogenodimethylsilyl end groups;
- poly(dimethylsiloxane-co-hydrogenomethylsiloxane)s bearing trimethylsilyl end groups;
- poly(dimethylsiloxane-co-hydrogenomethylsiloxane)s bearing hydrogenodimethyl-silyl end groups;
- polyhydrogenomethylsiloxanes bearing trimethylsilyl end groups;
- cyclic hydrogenomethylpolysiloxanes.

When branched or network polyorganosiloxanes are concerned, they may also comprise:
- siloxyl units "T" chosen from the units of formulae $HSiO_{3/2}$ and $LSiO_{3/2}$,
- siloxyl units "Q" of formula $SiO_{4/2}$.

Advantageously, the silicone composition according to the invention contains polyorganosiloxane compounds A and organohydrogenopolysiloxane compounds B in proportions such that the mole ratio of the hydrogen atoms bonded to silicon atoms in the organohydrogenopolysiloxane compound B to the alkenyl groups bonded to silicon atoms in the polyorganosiloxane compound A is preferably between 0.1 and 10, and more preferably between 0.5 and 5.

The silicone composition according to the invention also comprises a hydrosilylation catalyst C. Preferably, it is a platinum compound, for example chloroplatinic acid hexahydrate, the Karstedt catalyst which is constituted of platinum complexes with divinyltetramethyldisiloxane as ligand (see, for example, in U.S. Pat. No. 3,775,452) or a platinum catalyst comprising carbene ligands.

Preferably, when the catalyst C comprises platinum, the amount of inhibitor D preferably represents between 10 ppm and 2000 ppm by weight, more preferably between 20 ppm and 1000 ppm by weight, relative to the weight of platinum.

Other auxiliary agents and common additives may be incorporated into the composition according to the invention. They are chosen as a function of the applications in which said compositions are used.

As families of common functional additives, mention may be made of:
- adhesion promoters, for instance organosilicon compounds bearing both one or more hydrolyzable groups bonded to the silicon atom and one or more organic groups chosen from the group of (meth)acrylate, epoxy, and alkenyl radicals, even more preferentially from the group constituted by the following compounds, taken alone or as a mixture: vinyltrimethoxysilane (VTMO), 3-glycidoxypropyltrimethoxysilane (GLYMO), methacryloxypropyltrimethoxysilane (MEMO);
- antimisting additives, such as silica particles or branched polyorganosiloxanes;
- adhesion modulators;
- consistency-increasing additives;
- antifreezes;
- wetting agents;
- antifoams;
- fillers;
- pigments;
- bactericides;
- heat-resistance, oil-resistance or fire-resistance additives, for example metal oxides.

In quantitative terms, the compositions according to the invention may have proportions that are standard in the technical field under consideration, given that the intended application must also be taken into account.

The silicone composition according to the invention may be prepared by mixing the various compounds according to the methods known to those skilled in the art. Preferably, the hydrosilylation catalyst is the final compound added to the mixture. It is not excluded in the present invention for the constituents of the inhibition mixture (inhibitor, photoinitiator and TTMSS) to be mixed apart and then added to the other constituents of the composition in the form of a ready-to-use additive.

The silicone composition according to the invention is particularly suitable for preparing a silicone coating, and most particularly for preparing a non-stick silicone coating. This coating makes it possible to render supports non-adherent to surfaces to which they would normally adhere. A subject of the present invention is also a process for preparing a non-stick silicone coating on a substrate, comprising the steps consisting in coating at least part of said substrate with said silicone composition according to the invention, followed by curing this composition by irradiation.

The support is preferably made of flexible material. It may advantageously be chosen from flexible paper, cardboard or similar supports, flexible woven or nonwoven fibrous supports, and flexible polymeric supports. As examples of supports, mention may be made of papers of various types (supercalendered, coated, glassine), cardboards, cellulose sheets, films of plastic material, especially of polyester (for example of PET), of polyethylene, of polypropylene or of polyvinyl chloride.

The composition may be applied by means of coating devices known to those skilled in the art, in particular by means of an industrial high-speed coating machine, for example at speeds of greater than or equal to 100 m/min, preferably greater than or equal to 300 m/min, and more preferably between 500 m/min and 1000 m/min. These devices comprise a five-roller coating head and systems with air blades or with an equalizing bar, for depositing the liquid composition onto the supports. The amounts of compositions deposited are of the order of 0.1 to 5 g per m² of surface to be treated, which corresponds to the deposition of layers of the order of 0.1 to 5 μm thick.

The support coated with the composition is exposed to radiation whose wavelength is preferably between 200 nm and 800 nm, preferably a UV radiation whose wavelength is preferably between 200 nm and 400 nm. The UV lamps commonly used are mercury-vapor UV lamps (high pressure, low pressure and above all medium pressure). These lamps may be doped with gallium-indium, with iron or with lead to modify the emission wavelength. The metals contained in these lamps may be excited by electric arc and microwave discharge. Other sources of radiation that are currently industrially available are LEDs with emission spectra focused on 365 nm, 375 nm, 385 nm, 395 nm, 400 nm and 405 nm, and also halogen lamps. The coated support may optionally be heated to a temperature of at least 40° C., preferably between 40° C. and 190° C., so as to accelerate the curing of the composition according to the invention.

Moreover, this curable silicone composition may also be used for preparing hard elastomeric materials. The process for preparing hard elastomeric materials consists in bringing about the curing of the composition by irradiation and optionally by heating of the curable silicone composition.

These hard elastomeric materials may be prepared and formed via techniques known to those skilled in the art such as molding or extrusion in a UV chamber. The elastomeric material may have a variable thickness. Preferably, in the present invention, the elastomeric material has a low thickness generally between 0.15 mm and 1 cm, preferably between 1 mm and 1 cm. In the case where the elastomeric material has a larger thickness, for example between 1 cm and 10 cm, it is possible to adapt the wavelength of the irradiation so that it penetrates deeply into the material. Moreover, photosensitizing compounds known to those skilled in the art may be added to the silicone composition. This embodiment is particularly suitable for manufacturing elastomeric tubes, cables or rods, and for encapsulating (potting) electronic components.

The inventors have shown that, when the silicone composition according to the invention is subjected to irradiation, the system for inhibiting the reaction is deactivated and the composition can cure via the effect of the hydrosilylation reactions. The silicone composition according to the invention has the following advantageous properties:

- The silicone composition has good stability on storage: its pot life, without being subjected to irradiation, is greater than 12 hours, preferably greater than 15 hours, at room temperature and greater than one hour at 40° C. This shows that the inhibition system is efficient. The hydrosilylation reactions are advantageously inhibited for times that are sufficient to allow the industrial manipulation of the silicone composition.
- The inventors have discovered, very advantageously, that the removal of the inhibition is very rapid. The speed of removal of the inhibition, which is brought about by irradiation of the silicone composition, may be estimated by measuring the time required to observe a start of crosslinking of the composition.
- In addition, the rapid removal of the inhibition is advantageously accompanied by good crosslinking kinetics. The combination of rapid removal of inhibition with high crosslinking kinetics makes it possible to achieve short gel times for the compositions. The use of the inhibition system according to the invention makes it possible to lower the gel time of the composition significantly, without, however, reducing the stability on storage of the composition.
- The system for inhibiting the reaction allows faster removal of inhibition than the known inhibitors. As a result, for an equal irradiation time, the silicone composition according to the invention can cure equivalently to the known compositions with less catalyst. The composition according to the invention thus advantageously makes it possible to reduce the amount of hydrosilylation catalyst in the silicone composition without modifying the rate of curing.

The curing of the silicone composition is activated by irradiation. This method is easy to perform, and has the advantage of being able to choose the curing zone, thus making it possible to consume less energy than via thermal methods. Advantageously, the irradiation does not cause any excessive heating of the composition and of the support onto which it has been deposited. Preferably, the composition and its support are subjected to temperatures of less than or equal to 50° C., more preferably less than or equal to 40° C., and more preferably less than or equal to 35° C. These temperatures are markedly lower than the temperatures required for curing silicone compositions thermally, which require passage through an oven heated to a temperature generally of between 70° and 200° C. The composition according to the invention is thus particularly useful for coating heat-sensitive supports.

The silicon composition according to the invention may be used in ambient atmosphere, which represents a major industrial advantage relative to other photocrosslinkable silicone compositions. Specifically, irradiation-crosslinkable silicone compositions conventionally use radical chemical reactions, which often require an inert atmosphere, without oxygen. In the present invention, the reactions for curing the silicone composition are not radical reactions, but essentially polyaddition reactions. Inertizing of the production means is thus advantageously unnecessary.

Other aims, features and advantages of the invention will emerge from the following examples, which are given for purely illustrative purposes and are in no way limiting.

EXAMPLES

Reagents Used

POS$^{Vi}$ A: Polydimethylsiloxane oil bearing vinyl chain ends, with a mean formula M$^{vi}$D$_{75}$M$^{vi}$ and a dynamic viscosity at 25° C.=100 mPa·s, with M$^{vi}$=(CH$_3$)$_2$(vinyl) SiO$_{1/2}$ and D=(CH$_3$)$_2$SiO$_{2/2}$.

POS$^H$ B: Polymethylhydrogenosiloxane oil bearing trimethylsilyl end groups, of mean formula M$_2$D'$_{45}$ and with a dynamic viscosity at 25° C. of 20 mPa·s, with M=(CH$_3$)$_3$SiO$_{1/2}$ and D'=H(CH$_3$)$_1$SiO$_{2/2}$.

Catalyst C: solution of platinum 0 with divinyltetramethyldisiloxane ligands diluted in a silicone oil with a content of elemental Pt of 2800 ppm by mass.

Inhibitor D: 1-ethynyl-1-cyclohexanol (ECH), which is a true α-acetylenic alcohol.

Photoinitiator E:

Omnirad 102, sold by the company IGM Resins: 2-hydroxy-2-methyl-1-(4-tert-butyl)phenylpropanone (type I photoinitiator);

Esacure® TZT, sold by the company Lamberti: mixture of 4-methylbenzophenone and of 2,4,6-trimethylbenzophenone (type II photoinitiator).

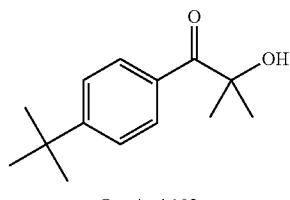

Omnirad 102

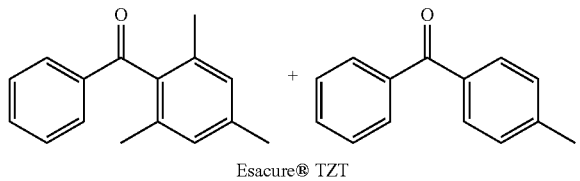

Esacure® TZT

TTMSS: tris(trimethylsilyl)silane, sold by the company Aldrich.

Preparation of the Silicone Compositions:

Each formulation was prepared in the proportions indicated in the tables below and in the following manner: the inhibitor D was mixed with POS$^{VI}$ A until dissolution was complete. POS$^H$ B was introduced into the mixture of inhibitor D+POS$^{VI}$ A. TTMSS F and a photoinitiator E were optionally added to this three-component mixture (in the amounts indicated in the tables). Finally, the formulation a was completed by adding catalyst C.

Experimental Protocol:

The duration of inhibition of the system is measured by monitoring the rheological behavior of the formulation. To do this, a device as represented in FIG. 1 was used. This device is equipped with a vibrating needle 1 dipping into the formulation studied 2. The vibration frequency of the needle is set. Before irradiation, formulation 2 is liquid and the needle 1 vibrates freely. The output voltage monitored by a signal processing device 3 is thus high. At the initial time to, the source of UV light 4 was switched on and this light irradiates formulation 2 via a mirror 5. When formulation 2 begins to cure under the effect of the crosslinking reactions, the oscillation amplitude of the needle 1 is reduced and the output voltage decreases.

The start of crosslinking is the time from which the output voltage is no longer constant.

The gel time of the formulation is defined here as being the minimum point of drift of the output voltage as a function of time.

Prior to the tests performed on silicone formulations according to the invention, the temperature in the device was controlled. Formulation 2 is replaced with a silicone oil. A temperature measurement probe was dipped into the silicone oil. The sample was irradiated for 45 minutes. The maximum temperature reached is 35° C.

Tests and Results:

All of the tests were performed under the same conditions (moment of introduction of the platinum-based catalyst, time and mode of homogenization of the mixture, volume of mixture, time between the various additions and engagement of the irradiation).

The formulations were prepared as described above in the proportions indicated in table 1:

TABLE 1

|  | Test 1 Comparative | Test 2 Comparative | Test 3 Comparative | Test 4 Comparative | Test 5 Invention |
|---|---|---|---|---|---|
| POS$^{Vi}$ A | 3.00 g | 3.00 g | 3.00 g | 3.00 g | 3.00 g |
| POS$^H$ B | 0.21 g | 0.21 g | 0.21 g | 0.21 g | 0.21 g |
| Catalyst C | 0.11 g | 0.11 g | 0.11 g | 0.11 g | 0.11 g |
| Inhibitor D | 2.01 g | 2.01 g | 2.01 g | 2.01 g | 2.01 g |
| Photoinitiator E: Omnirad 102 | 0 | 0 | 0 | 0.0198 g | 0.0247 g |
| TTMSS | 0 | 0.0128 g | 0.0297 g | 0 | 0.0140 g |
| Mole ratio: | | | | | |
| Inhibitor D/ Catalyst C | 15.45 | 15.63 | 15.95 | 14.99 | 14.66 |
| TTMSS/Inhibitor D | 0 | 2.12 | 4.93 | 0 | 2.32 |
| Photoinitiator E/ Inhibitor D | 0 | 0 | 0 | 3.70 | 4.62 |
| TTMSS/ Photoinitiator E | — | — | — | 0 | 0.50 |
| Result: | | | | | |
| Gel time (min): | 20.4 | 18.5 | 17.4 | 16.5 | 11.7 |
| Start of crosslinking (min): | 19 | 17.5 | 16 | 13 | 9 |

The power of the mercury lamp was 5.6 W/cm$^2$.

Figure 2:
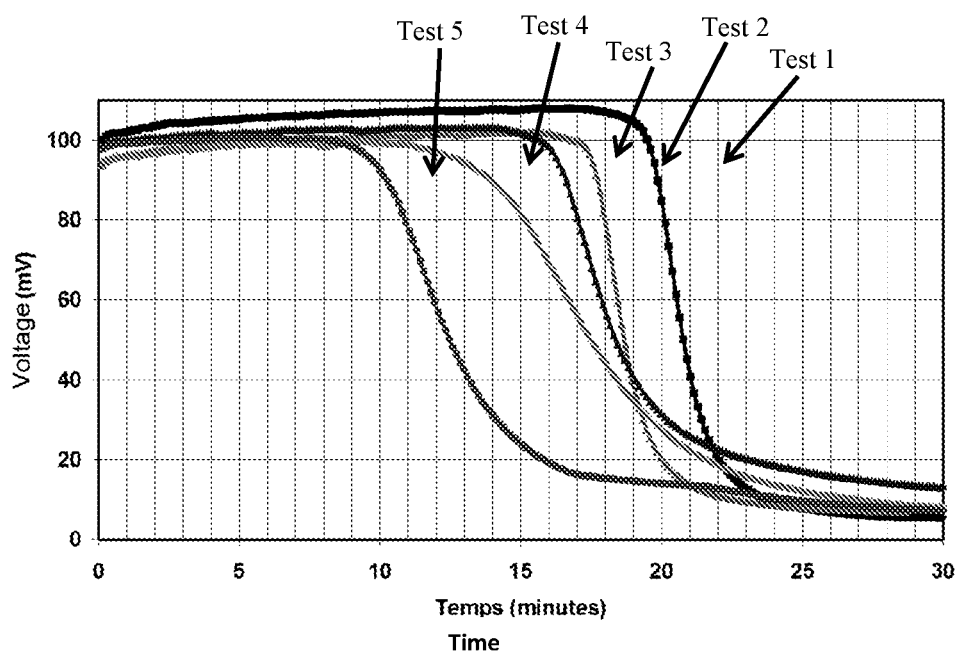
FIG. 2 represents the evolution of the voltage at the terminals of the oscillating needle as a function of time during tests 2 to 6 described in the examples.

The curves representing the change in output voltage at the terminals of the oscillating needle as a function of time during tests 1 to 5 are reported in FIG. 2.

For a given Inhibitor D/Catalyst C ratio, the TTMSS added without photoinitiator and in large molar excess relative to the inhibitor (TTMSS/Inhibitor D mole ratios of 2 to 5) has a positive but limited impact on the time of start of crosslinking and the gel time (cf. comparative tests 1, 2 and 3).

Under the same conditions, the addition of photoinitiator E without TTMSS (comparative test 4), in a Photoinitiator E/Inhibitor D mole ratio of 3.7, produces a more efficient effect on the time of start of crosslinking and the gel time.

Finally, when the photoinitiator E and TTMSS are added together (test 5 according to the invention), a synergistic effect is observed: the start of crosslinking is observed after 9 minutes and the gel time passes from 20.4 minutes to 11.7 minutes (cf. comparative test 1 and test 5 according to the invention).

Other formulations were prepared in the proportions indicated in table 2:

TABLE 2

| | Test 6 Comparative | Test 7 Comparative | Test 8 Comparative | Test 9 Comparative | Test 10 Comparative | Test 11 Invention |
|---|---|---|---|---|---|---|
| $POS^{Vi}$ A (in moles of Si-vinyl functions) | $3.66 \times 10^{-3}$ | $3.66 \times 10^{-3}$ | $3.66 \times 10^{-3}$ | $3.66 \times 10^{-3}$ | $3.66 \times 10^{-3}$ | $3.66 \times 10^{-3}$ |
| $POS^{H}$ B (in moles of Si—H functions) | $6.12 \times 10^{-3}$ | $6.13 \times 10^{-3}$ | $6.13 \times 10^{-3}$ | $6.13 \times 10^{-3}$ | $6.14 \times 10^{-3}$ | $6.12 \times 10^{-3}$ |
| Catalyst C (in ppm of Pt) | 61 | 61 | 59 | 63 | 64 | 68 |
| Inhibitor D (in moles) | $4.65 \times 10^{-5}$ | $4.65 \times 10^{-5}$ | $4.66 \times 10^{-5}$ | $4.65 \times 10^{-5}$ | $4.65 \times 10^{-5}$ | $4.65 \times 10^{-5}$ |
| Photoinitiator E: Omnirad 102 (in moles) | 0 | $2.31 \times 10^{-5}$ | $9.40 \times 10^{-6}$ | 0 | 0 | $9.24 \times 10^{-6}$ |
| TTMSS (in moles) | 0 | 0 | 0 | $9.53 \times 10^{-6}$ | $2.36 \times 10^{-5}$ | $9.84 \times 10^{-7}$ |
| Mole ratio: | | | | | | |
| TTMSS/Inhibitor D | 0 | 0 | 0 | 0.2 | 0.5 | 0.02 |
| Photoinitiator E/Inhibitor D | 0 | 0.5 | 0.2 | 0 | 0 | 0.2 |
| TTMSS/Photoinitiator E | — | 0 | 0 | — | — | 0.1 |
| Result: | | | | | | |
| Gel time (min): | 24 | 16 | 17 | 23 | 22 | 13 |
| Start of crosslinking (min): | 21 | 13 | 15 | 20 | 19 | 10 |
| Pot life (hours): | 25 | 23 | 25 | 20 | 18 | 20 |

The results obtained from the tests described in table 2 confirm that the presence of TTMSS without the photoinitiator (comparative tests 9 and 10) have no significant impact on the start of crosslinking and the gel time for TTMSS/Inhibitor D mole ratios of the order of 0.2 to 0.5. In these cases, the gel times are between 22 and 24 minutes.

The addition of the photoinitiator E (without addition of TTMSS) has a greater effect. For a Photoinitiator E/Inhibitor D mole ratio of 0.5 (comparative test 7), the gel time is 16 minutes as opposed to 24 minutes for the reference formulation (comparative test 6).

Test 11 (according to the invention) illustrates the beneficial influence of the presence of TTMSS and the photoinitiator E. A 45% reduction in the gel time relative to the reference formulation (comparative test 6) and a 23% reduction relative to the formulation containing only the photoinitiator E (comparative test 8) are observed.

Other formulations were prepared in the proportions indicated in table 3 below and confirm the advantages of the invention.

TABLE 3

| | Test 12 Comparative | Test 13 Invention | Test 14* Invention | Test 15 Invention | Test 16 Invention | Test 17* Invention | Test 18 Invention |
|---|---|---|---|---|---|---|---|
| $POS^{Vi}$ A (in moles of Si-vinyl functions) | $3.65 \times 10^{-3}$ | $3.66 \times 10^{-3}$ | $3.66 \times 10^{-3}$ | $3.66 \times 10^{-3}$ | $3.66 \times 10^{-3}$ | $3.66 \times 10^{-3}$ | $7.58 \times 10^{-3}$ |
| $POS^{H}$ B (in moles of Si—H functions) | $6.12 \times 10^{-3}$ | $6.12 \times 10^{-3}$ | $6.13 \times 10^{-3}$ | $6.13 \times 10^{-3}$ | $6.14 \times 10^{-3}$ | $6.13 \times 10^{-3}$ | $1.27 \times 10^{-2}$ |
| Catalyst C (in ppm of Pt) | 62 | 63 | 62 | 63 | 61 | 62 | 58 |
| Inhibitor D (in moles) | $4.65 \times 10^{-5}$ | $4.65 \times 10^{-5}$ | $4.66 \times 10^{-5}$ | $4.65 \times 10^{-5}$ | $4.66 \times 10^{-5}$ | $4.66 \times 10^{-5}$ | $9.64 \times 10^{-5}$ |
| Photoinitiator E: Omnirad 102 (in moles) | 0 | $9.33 \times 10^{-6}$ | $9.34 \times 10^{-6}$ | $9.29 \times 10^{-6}$ | $1.04 \times 10^{-5}$ | $9.34 \times 10^{-6}$ | $1.90 \times 10^{-4}$ |
| TTMSS (in moles) | 0 | $1.48 \times 10^{-7}$ | $1.02 \times 10^{-6}$ | $9.44 \times 10^{-6}$ | $1.03 \times 10^{-6}$ | $1.02 \times 10^{-6}$ | $1.87 \times 10^{-6}$ |

TABLE 3-continued

|  | Test 12 Comparative | Test 13 Invention | Test 14* Invention | Test 15 Invention | Test 16 Invention | Test 17* Invention | Test 18 Invention |
|---|---|---|---|---|---|---|---|
| Mole ratio: | | | | | | | |
| TTMSS/Inhibitor D | 0 | 0.003 | 0.02 | 0.2 | 0.02 | 0.02 | 0.02 |
| Photoinitiator E/Inhibitor D | 0 | 0.2 | 0.2 | 0.2 | 0.02 | 0.2 | 2 |
| TTMSS/Photoinitiator E | — | 0.02 | 0.1 | 1 | 1 | 0.1 | 0.01 |
| Result: | | | | | | | |
| Gel time (min): | 20 | 11 | 13 | 12 | 16 | 13 | 16 |
| Start of crosslinking (min): | 18 | 9 | 10 | 10 | 12 | 10 | 9 |
| Pot life (hours): | 22 | 19 | 22 | 19 | | 22 | |

(*tests 14 and 17 are identical)

Feasibility Test with a Type II Photoinitiator E:
Several formulations were prepared in the proportions indicated in table 4 below:

TABLE 4

|  | Test 19 Comparative | Test 20 Comparative | Test 21 Comparative | Test 22 Invention | Test 23 Invention |
|---|---|---|---|---|---|
| $POS^{Vi}$ A | 10 g (4 mmol) | 10 g (4 mmol) | 10 g (4 mmol) | 10 g (4 mmol) | 10 g (4 mmol) |
| $POS^H$ B | 430 mg (6.9 mmol) | 430 mg (6.9 mmol) | 430 mg (6.9 mmol) | 430 mg (6.9 mmol) | 430 mg (6.9 mmol) |
| Catalyst C | 100 mg (0.0014 mmol) | 100 mg (0.0014 mmol) | 100 mg (0.0014 mmol) | 100 mg (0.0014 mmol) | 100 mg (0.0014 mmol) |
| Inhibitor D | 15 mg (0.121 mmol) | 15 mg (0.121 mmol) | 15 mg (0.121 mmol) | 15 mg (0.121 mmol) | 15 mg (0.121 mmol) |
| Photoinitiator E: Omnirad 102 | 0 | 0 | 0.023 mmol | 0.023 mmol | 0 |
| Photoinitiator E: Esacure TZT | 0 | 0 | 0 | 0 | 0.023 mmol |
| TTMSS | 0 | 67 mg (0.270 mmol) | 0 | 67 mg (0.270 mmol) | 67 mg (0.270 mmol) |
| Mole ratio: | | | | | |
| Inhibitor D/Catalyst C | 86 | 86 | 86 | 86 | 86 |
| TTMSS/Inhibitor D | 0 | 2.2 | 0 | 2.2 | 2.2 |
| Photoinitiator E/Inhibitor D | 0 | 0 | 0.19 | 0.19 | 0.19 |
| TTMSS/Photoinitiator E | — | — | 0 | 11.7 | 11.7 |
| Result: | | | | | |
| Crosslinking time: | 160 min | 160 min | 160 min | 148 min | 148 min |

The addition of a type II photoinitiator has the same effect as the addition of a type I photoinitiator.

The invention claimed is:

1. A curable silicone composition comprising:
   A. at least one organopolysiloxane comprising, per molecule, at least two alkenyl radicals bonded to silicon atoms;
   B. at least one organohydrogenopolysiloxane comprising, per molecule, at least two hydrogen atoms bonded to silicon atoms;
   C. at least one hydrosilylation catalyst;
   D. at least one inhibitor chosen from α-acetylenic alcohols, α, α'-acetylenic diesters, conjugated ene-yne compounds, α-acetylenic ketones, acrylonitriles, maleates and fumarates, and mixtures thereof,
   E. at least one photoinitiator,
   F. tris(trimethylsilyl)silane (TTMSS).

2. The composition as claimed in claim 1, wherein the inhibitor D is an inhibitor of α-acetylenic alcohol type chosen from the compounds of formula (D1) below:

$$(R^1)(R^2)C(OH)\text{—}C\!\equiv\!CH \qquad (D1)$$

in which:
   the group $R^1$ represents an alkyl group, a cycloalkyl group, a (cycloalkyl)alkyl group, an aryl group or an arylalkyl group,
   the group $R^2$ represents a hydrogen atom, an alkyl group, a cycloalkyl group, a (cycloalkyl)alkyl group, an aryl group or an arylalkyl group,
   or $R^1$ and $R^2$ constitute, together with the carbon atom to which they are attached, a 5-, 6-, 7- or 8-membered aliphatic ring, optionally substituted one or more times.

3. The composition as claimed in claim 1, wherein the inhibitor D is an inhibitor of α, α'-acetylenic diester type chosen from the compounds of formula (D2) below:

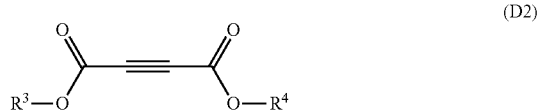

in which the groups $R^3$ and $R^4$, which may be identical or different, represent, independently of each other, an alkyl group, a cycloalkyl group, a (cycloalkyl)alkyl group, an aryl group, an arylalkyl group or a silyl group.

4. The composition as claimed in claim 1, wherein the inhibitor D is an inhibitor of maleate or fumarate type chosen from the compounds of formulae (D6) and (D7) below:

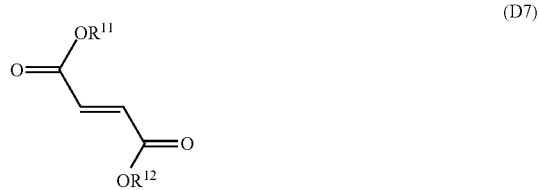

in which $R^{11}$ and $R^{12}$, which may be identical or different, represent, independently of each other, an alkyl or alkenyl group, a cycloalkyl group, a (cycloalkyl)alkyl group, an aryl group or an arylalkyl group, said alkyl, alkenyl, cycloalkyl, (cycloalkyl)alkyl, aryl and arylalkyl groups optionally being substituted with an alkoxy group.

5. The composition as claimed in claim 1, comprising at least one type I photoinitiator E, which is at least one α-hydroxyacetophenone, or at least one type II photoinitiator E, which is at least one benzophenone or a mixture of several benzophenones.

6. The composition as claimed in claim 1, wherein the mole ratios between the inhibitor D, the photoinitiator E and TTMSS are such that:
the mole ratio between TTMSS and the inhibitor D is between 0.0001 and 20 and/or
the mole ratio between TTMSS and the photoinitiator E is between 0.001 and 10.

7. The composition as claimed in claim 1, wherein, when the catalyst C comprises platinum, and the amount of inhibitor D represents between 10 ppm and 2000 ppm by weight, relative to the weight of platinum.

8. A process for preparing a silicone coating on a substrate, comprising: coating said substrate with a curable silicone composition as defined in claim 1 and curing said composition by irradiation.

9. A process for preparing hard elastomeric materials, comprising: curing the curable silicone composition as defined in claim 1 by irradiation and optionally by heating said composition.

10. A mixture comprising (i) an inhibitor chosen from α-acetylenic alcohols, α,α'-acetylenic diesters, conjugated ene-yne compounds, α-acetylenic ketones, acrylonitriles, maleates and fumarates and mixtures thereof, (ii) a photoinitiator and (iii) TTMSS, said mixture being an inhibition system in a curable silicone composition.

11. The composition as claimed in claim 1, wherein the G is at least one organohydrogenopolysiloxane comprising, per molecule, at least three hydrogen atoms bonded to silicon atoms.

12. The composition as claimed in claim 1, wherein the mole ratios between the inhibitor D, the photoinitiator E and TTMSS are such that:
the mole ratio between TTMSS and the inhibitor D is between between 0.001 and 5 and
the mole ratio between TTMSS and the photoinitiator E is between 0.005 and 5.

13. The composition as claimed in claim 1, wherein the mole ratios between the inhibitor D, the photoinitiator E and TTMSS are such that:
the mole ratio between TTMSS and the inhibitor D is between 0.001 and 3; and
the mole ratio between TTMSS and the photoinitiator E is between 0.01 and 2.

14. The composition as claimed in claim 1, wherein, when the catalyst C comprises platinum, and the amount of inhibitor D represents 20 ppm and 1000 ppm by weight, relative to the weight of platinum.

15. The composition as claimed in claim 1, wherein the at least one inhibitor D comprises a α-acetylenic alcohol.

16. The composition as claimed in claim 1, wherein the at least one inhibitor D comprises a α,α'-acetylenic diester.

17. The composition as claimed in claim 1, wherein the at least one inhibitor D comprises a conjugated ene-yne compound.

18. The composition as claimed in claim 1, wherein the at least one inhibitor D comprises a α-acetylenic ketone.

19. The composition as claimed in claim 1, wherein the at least one inhibitor D comprises an acrylonitrile.

20. The composition as claimed in claim 1, wherein the at least one inhibitor D comprises a maleate or fumarate.

* * * * *